United States Patent [19]

Behrle

[11] Patent Number: 4,739,575
[45] Date of Patent: Apr. 26, 1988

[54] FISHING POLE HOLDER MOUNT

[76] Inventor: William L. Behrle, 385 Grand Terrace Ct., Fenton, Mo. 63026

[21] Appl. No.: 78,100

[22] Filed: Jul. 27, 1987

[51] Int. Cl.<sup>4</sup> .............................................. A01K 97/10
[52] U.S. Cl. ...................................... 43/21.2; 248/538
[58] Field of Search .................. 43/21.2; 248/520, 538

[56] References Cited

U.S. PATENT DOCUMENTS

| 1,987,842 | 1/1935 | Sampson | 43/21.2 |
| 2,628,795 | 2/1953 | Didderich | 248/538 |
| 3,246,865 | 4/1966 | Latimer | 43/21.2 |
| 3,570,793 | 3/1971 | Shackel | 43/21.2 |
| 3,783,548 | 1/1974 | Fisher | 43/21.2 |
| 3,906,653 | 9/1975 | Williams | 43/21.2 |
| 4,565,025 | 1/1986 | Behrle | 43/21.2 |

Primary Examiner—Gene P. Crosby
Attorney, Agent, or Firm—Rogers, Howell, Moore & Haferkamp

[57] ABSTRACT

A fishing pole holder mount comprising a C clamp to which a holder tube is swivelly mounted so that it can be fastened to the gunwale of a boat such as a johnboat, regardless of whether that gunwale be cylindrical or square or otherwise, and so that the fishing pole holder can be put at whatever angle the fisherman desires it to have.

5 Claims, 1 Drawing Sheet

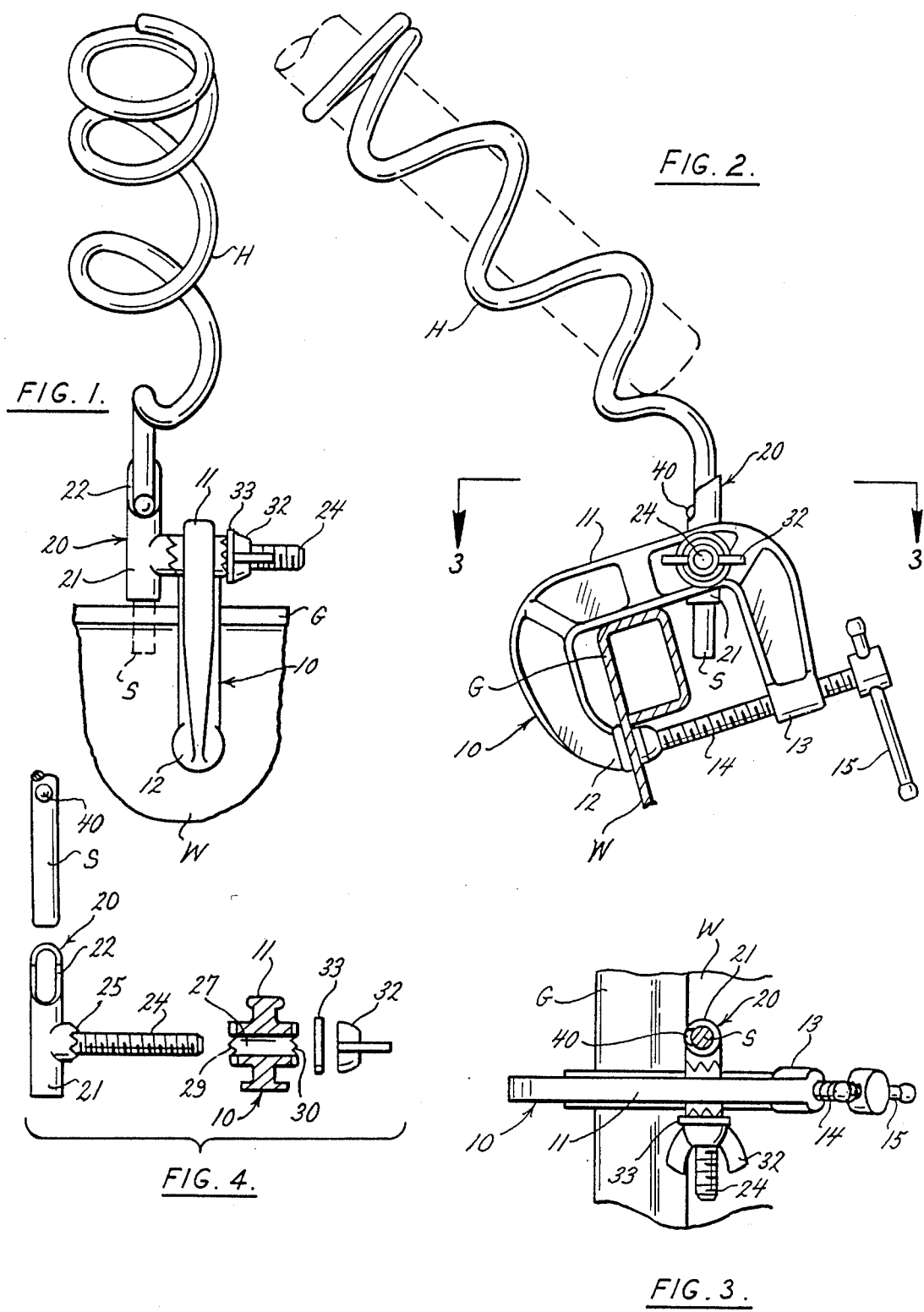

FISHING POLE HOLDER MOUNT

BACKGROUND AND SUMMARY OF THE INVENTION

The present invention relates to a fishing pole holder mount. It comprises a C clamp type of arrangement with a tubular or socket member swivelly mounted on the C clamp to receive the shank of a fishing rod holder. It is an object of the invention to provide a fishing rod holder arrangement that can be mounted on any of various type boat gunwales and to fishing boat sides that have different slopes, with the tubular arrangement swivelly supported on the C clamp so that it can be given the desired slope for holding the fishing pole.

Various arrangements have been suggested in the past that would include an adjustable mount for fishing rod holder. Reference can be made to the Goldberg Marine Catalog of 1978 and to the Latimer U.S. Pat. No. 3,246,865, Shackel U.S. Pat. No. 3,570,793, Rogers U.S. Pat. No. 3,259,346, and Determan U.S. Pat. No. 2,360,402, all of which show some form of attachment for a fishing rod holder that provides an adjustable angle to the water. However, none of these shows it in combination with a C clamp type of arrangement so that it can be mounted selectively on any kind of a gunwale regardless of the angle of the gunwale.

It is also known to use C clamps or similar type structures for holding fishing rod holders. For example, the Silver U.S. Pat. No. 3,033,503 shows such a type of clamp. However, it does not show the adjustment feature, and therefore is very limited of application. Furthermore, it suggests that the C clamp is mounted differently, and it contains no indication that it could be mounted on a cylindrical type gunwale. The applicant's device can be mounted on any type gunwale. On cylindrical type gunwales it can be screwed down securely without any necessity of drilling or other modification of the gunwale.

DESCRIPTION OF THE DRAWINGS

FIG. 1 is an elevation of a mount facing the side of a boat;

FIG. 2 is a view at the right side of FIG. 1 with a fishing pole indicated in dashed lines;

FIG. 3 is a horizontal section taken on the line 3—3 of FIG. 2; and

FIG. 4 is an expanded view of the device.

DESCRIPTION OF THE PREFERRED EMBODIMENT

This fishing rod holder mount is particularly useful in connection with a fishing rod holder such as is illustrated in FIGS. 1 and 2 and which is also shown in the applicant's prior U.S. Pat. Nos. 4,565,025 and 4,669,214. It will be understood that other types can be used also with the present invention.

The invention comprises a C clamp 10 having a U shaped base with a bight portion 11 and end portions 12 and 13. A screw 14 with a handle 15 acts to secure the C clamp onto the object to hold it.

The bight portion 11 holds a tubular socket device generally indicated at 20. This device comprises a tube 21 notched at its top at 22. It also comprises a screw 24 that preferably extends from a toothed shoulder 25. The screw 24 is adapted to be fitted into a transverse hole 27 through the bight portion 11 of the C clamp 10. This portion of the C clamp is likewise notched on opposite sides as shown at 29 and 30. The notches are exaggerated in size for clarity of the drawing. They should be smaller so that more positions of adjustment can be had. When the screw 24 is inserted through the passage 27, it can be firmly held by a wing nut 32 and a washer 33.

In use, the C clamp can be fitted over the gunwale G of a boat. The wall W of the boat usually extends at an angle upwardly and outwardly. The gunwale may be cylindrical or rectangular or of another shape. The C clamp being mounted as shown in FIG. 2 is screwed down, the screw 14 being adapted to compress the wall W between the clamp end 12 and the head on the screw 14. It will be seen that this arrangement can be fitted around any shape of gunwale and will not require any modification of the gunwale at all. As a matter of fact, the C clamp can be mounted on any boat portion that can be embraced between the end 12 of the C clamp and the head of the screw 14, although it is preferable to have it mounted as illustrated.

As illustrated here, the fishing rod holder H has a shank S with a nub 40 extending outwardly from it, and usually integral with it. The shank S is slipped into the tubular member 21 until the nub 40 engages into the notch 22 at the upper end of the tubular member. This is designed to prevent the fishing rod holder from spinning or rotating about the axis of the shank.

The wing nut 32 can be released sufficiently to free the teeth 25 from the teeth on the C clamp with which they have been engaged. This being done, the member 20 can be twisted about the axis of the screw 24 until it gives a desired angle for the fishing rod holder H. Thereupon, the wing nut 35 can be retightened, drawing the teeth 25 into the corresponding teeth of the C clamp and holding the device securely so that it will not twist, but it will have the desired angle.

Sometimes it may be desirable to reverse the C clamp so that the handle portion 15 is outside the boat. In such case, the tubular member 20 needs to be turned around so that the notch will face outwardly. To do this, the screw 24 is removed from the C clamp member and inserted from the opposite side. This is the reason for having the notches 29 and 30 on the opposite sides of the C clamp.

There are various changes and modifications which may be made to the invention as would be apparent to those skilled in the art. However, these changes or modifications are included in the teaching of the disclosure, and it is intended that the invention be limited only by the scope of the claims appended hereto.

What I claim is:

1. A fishing rod holder mount for use in a boat or like support comprising a tubular member into which the rod holder may be inserted, and supporting means to attach the tubular member to the support, the said means being attachable without modification of the boat and being readily removable from the boat, the arrangement incorporating a rockable, tightenable connection between the tubular member and the supporting means to enable the tubular member to be securely positioned at different angles with respect to the support so that the fishing rod can be supported at different angles to the water.

2. The arrangement of claim 1 wherein the tubular member has a notch adapted to receive an abutment on the fishing rod holder, the arrangement being to prevent swivelling of the fishing rod holder in the tubular member.

3. The arrangement of claim 1 wherein the means to mount the tubular member onto the support comprises a C clamp and wherein the tubular member is swivelly mounted ont the bight portion of the C clamp.

4. The arrangement of claim 3 wherein the connection of the tubular member to the C clamp is removable and can be inserted from either side of the C clamp.

5. The arrangement of claim 4 wherein the means for attaching the tubular member to the C clamp comprises a screw projection on the tubular member and an opening through the C clamp bight portion through which the screw member is inserted and wherein there is a nut attachable to the end of the screw member to secure the tubular member to the C clamp, there being notch-like portions between the screw member and the C clamp to enable the parts to be securely held together against slippage.

* * * * *